United States Patent

[11] 3,589,636

[72] Inventor Morris E. Brown
Fairport, N.Y.
[21] Appl. No. 836,300
[22] Filed June 25, 1969
[45] Patented June 29, 1971
[73] Assignee Eastman Kodak Company
Rochester, N.Y.

[54] SPINDLE CONSTRUCTION AND MEANS FOR LOCATING A CARTRIDGE WITH RESPECT TO MOTION PICTURE PROJECTOR OR THE LIKE
7 Claims, 5 Drawing Figs.

[52] U.S. Cl. .......... 242/68.3
[51] Int. Cl. .......... B65h 17/02
[50] Field of Search .......... 242/71.1, 71.2, 110.1, 110.2, 201, 210, 85, 130.2, 68.3, 103

[56] References Cited

UNITED STATES PATENTS

| | | | |
|---|---|---|---|
| 1,538,477 | 5/1925 | Epstein | 242/103 X |
| 3,104,842 | 9/1963 | Loewe | 242/68.3 |
| 3,249,314 | 5/1966 | Kjos | 242/68.3 |
| 3,400,899 | 9/1968 | Tytgath | 242/130.2 |

*Primary Examiner*—George F. Mautz
*Assistant Examiner*—Gregory A. Walters
*Attorneys*—Robert W. Hampton and Herman G. Childress

ABSTRACT: A reel for processed motion picture film or other web material positioned within a cartridge is mounted for movement with respect to the cartridge by means of a spindle that projects through a centrally located opening within the reel. The spindle is pivotal about a point located at the center of a spherical element, and the pivot point preferably is located at the center of mass of the rotating parts. This spindle construction permits adjustment of the axis of rotation of the reel so that the reel can wobble and so that flanges of the reel which might otherwise contact walls of the cartridge can move away from the cartridge walls, thus reducing friction therebetween. Provision is made for both horizontal and vertical positioning of the reel. In addition, improved means for locating or orienting a cartridge to respond to dynamic forces encountered during rotation of the reel within the cartridge.

MORRIS E. BROWN
INVENTOR.

BY D. Herman Childress
Robert W Hampton
ATTORNEYS

MORRIS E. BROWN
INVENTOR.

BY D. Herman Childress
Robert W Hampton
ATTORNEYS

MORRIS E. BROWN
INVENTOR.

BY G. Herman Childress
Robert W Hampton
ATTORNEYS

SPINDLE CONSTRUCTION AND MEANS FOR LOCATING A CARTRIDGE WITH RESPECT TO MOTION PICTURE PROJECTOR OR THE LIKE

CROSS REFERENCES TO RELATED APPLICATIONS

Reference is made to commonly assigned copending U.S. Pat. application, Ser. No. 731,880, entitled "Spindle for Cartridge-Loading Motion Picture Projectors," filed in the name of Frank W. Paul Jr. et al. on May 24, 1968, now U.S. Pat. No. 3,508,718; U.S. Pat. application, Ser. No. 731,463, entitled "Reel for Cartridge-Loading Motion Picture Projector," filed in the name of Edward S. McKee on May 23, 1968, now U.S. Pat. No. 3,486,710; U.S. Pat. application, Ser. No. 731,561, entitled "Cartridge" filed in the name of John J. Bundschuh on May 23, 1968; U.S. Pat. application, Ser. No. 731,562, entitled "Cartridge and Means for Locating a Cartridge on a Projector or the Like," filed in the name of John J. Bundschuh on May 23, 1968; U.S. Pat. application, Ser. No. 736,524, entitled "Cartridge" filed in the name of John J. Bundschuh on May 23, 1968; U.S. Pat. application, Ser. No. 777,286, entitled "Adjustable Spindle Arm for Cartridge Loading Motion Picture Projector," filed in the name of John J. Bundschuh on Nov. 20, 1968.

BACKGROUND OF THE INVENTION

1. Field of the Invention

This invention relates to means for mounting a reel within a cartridge or the like and, more specifically, to the construction of a spindle for supporting a reel for rotation within a cartridge on a motion picture projector, and for limited adjustment of the axis of rotation of the reel within the cartridge. In addition, the invention relates to means for locating or orienting a cartridge relative to a motion picture projector or the like.

2. Description of the Prior Art

Many spindles used for supporting a supply reel in a motion picture projector are mounted so that the axis of rotation thereof is substantially fixed. This may produce undesirable results during operation of a cartridge-loading motion picture projector because rigid support of the supply reel within a cartridge may cause the reel flanges to engage the cartridge walls and produce undesirably high frictional forces. Theoretically, the construction and mounting of the spindle, reel and cartridge should locate the reel within the cartridge so that the beforementioned friction is not produced. However, in practice the theoretical optimum conditions frequently are not achieved due to difficulties in the construction and mounting the spindle, reel and cartridge. More specifically, the spindle may not rotate about an axis of rotation exactly perpendicular to the plane within the cartridge in which the reel should rotate. Also, the reel flanges or the cartridge walls may become warped or otherwise distorted during manufacture, particularly when the reel or cartridge is thin and manufactured from plastic materials. In addition, it is known to provide weight sensitive clutch mechanisms for a supply spindle of a projector, and such spindles may be designed to deflect in response to a predetermined load imposed by a vertically positioned reel. When the spindle is deflected in response to such a load, it can produce (or increase) the undesirable friction between the reel and the cartridge mentioned before.

Various attempts have been made to avoid the undesirable friction between the reel and cartridge. For example, in U.S. Pat. No. 3,508,718, a spindle is disclosed which includes a sleeve that is axially movable on a supporting shaft, and the sleeve supports a reel within a cartridge, thereby allowing the reel to move away from any rubbing action between the reel and the cartridge. Also, the copending U.S. Pat. No. 3,486,710 discloses a reel having an opening therein for receiving a spindle, and the walls of the reel defining the opening are tapered to permit the reel to readily move or wobble with respect to the spindle axis in response to frictional forces resulting from the reel flanges contacting the cartridge walls.

SUMMARY OF THE INVENTION

It is an object of this invention to provide a spindle that permits the desired relative movement between the reel and the cartridge walls by allowing the reel to wobble about a pivot point, and also to provide a spindle construction that precisely locates the pivot point of the reel during such movement. This is accomplished in accordance with the present invention by providing a spindle which includes a reel-supporting member pivotally mounted with respect to a supporting shaft so that the reel is free to move in response to friction between the reel flanges and cartridge walls. In one embodiment of the invention the spindle axis is upright or vertical and the outer spindle part rests on a suitable portion of the inner spindle part. In another embodiment of the invention the spindle axis is horizontal, and means are provided for holding the outer spindle part on the inner spindle part. Another feature of the present invention comprises improved means for locating a cartridge on a projector so that the cartridge is free to move in one direction with respect to the spindle in response to high frictional forces exerted on the cartridge by the reel during rotation of the reel within the cartridge.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because motion picture projectors are well known, the present description will be directed in particular to elements forming part of, or cooperating more directly with, the present invention, motion picture projector elements not specifically shown or described herein being understood to be selectable from those known in the art.

Figure 2:
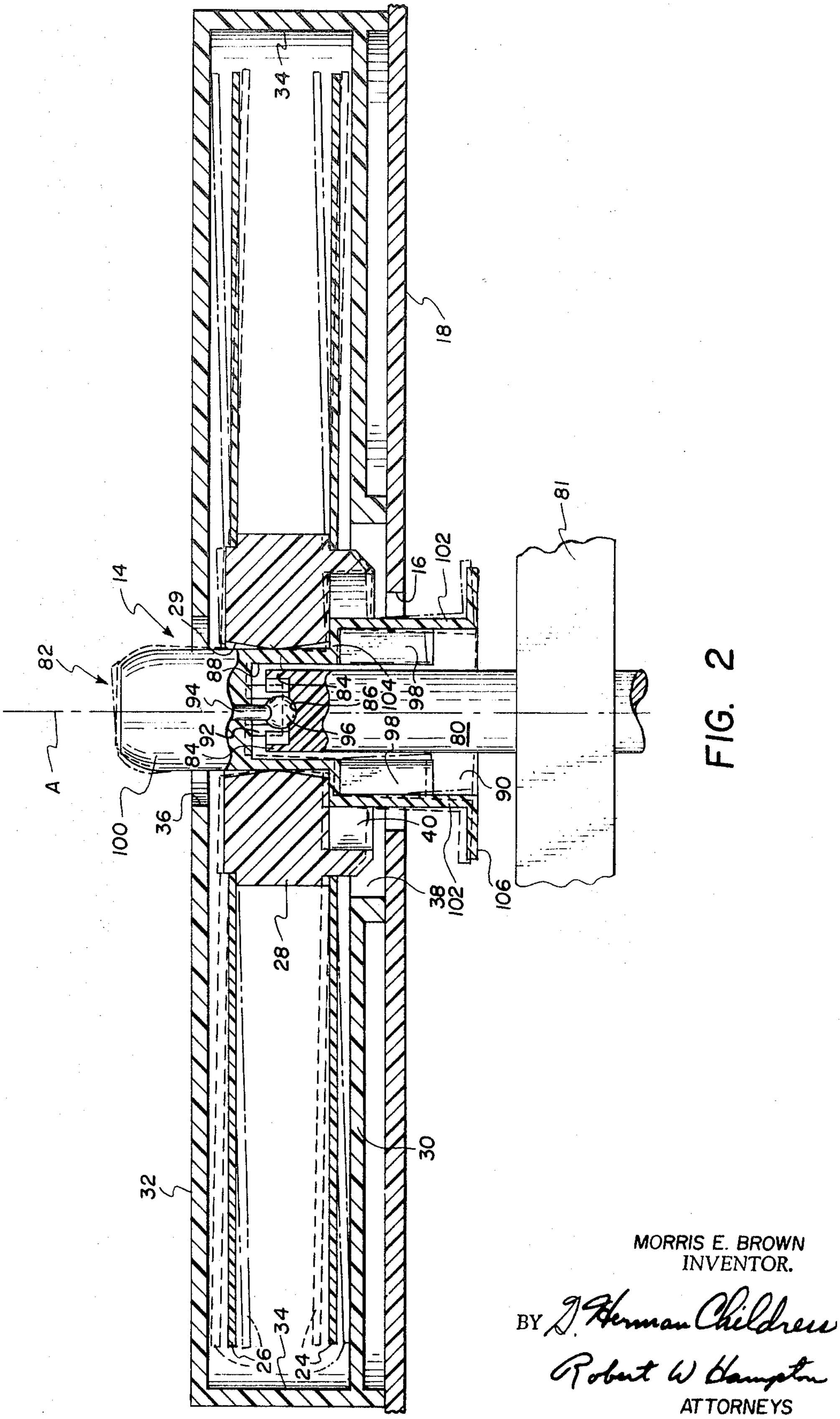
FIG. 2 is an enlarged view, partially in cross section, illustrating one preferred embodiment of a spindle of this invention and showing the manner in which it supports a reel for rotation within a cartridge located on the projector.

The present invention may be used in connection with various machines adapted to receive and transport an elongate strip of web material. As illustrated in the drawings and described herein the machine is a motion picture projector having a plate 10 with a recess or well 12 for receiving a cartridge. One spindle construction according to the present invention is generally designated 14 and it projects upwardly through an elongate slot 16 in the bottom wall 18 of the well. The projector receives a cartridge 20 containing a reel 22 on which an elongate strip of film F is wound. The reel comprises a pair of spaced and generally parallel flanges 24 and 26 which project radially outwardly from a centrally located hub portion 28. There is an opening 29 in the reel hub for receiving a portion of spindle 14 and the walls of the hub defining the reel opening may be tapered as illustrated in FIG. 2.

The cartridge 20 has a pair of spaced sidewalls 30 and 32 and an edge wall 34 which jointly substantially enclose reel 22. Wall 32 has a centrally located opening 36 and wall 30 has a somewhat larger centrally located opening 38 through which a portion of spindle 14 is adapted to project when the cartridge and reel are properly located on the projector in the manner described more fully hereinafter. Reel 28 preferably includes an annular flange 40 which projects axially from hub 28. Flange 40 has a diameter which is larger than the diameter of opening 36 but smaller than the diameter of opening 38 so that the reel cannot be improperly positioned within the cartridge.

Figure 1:
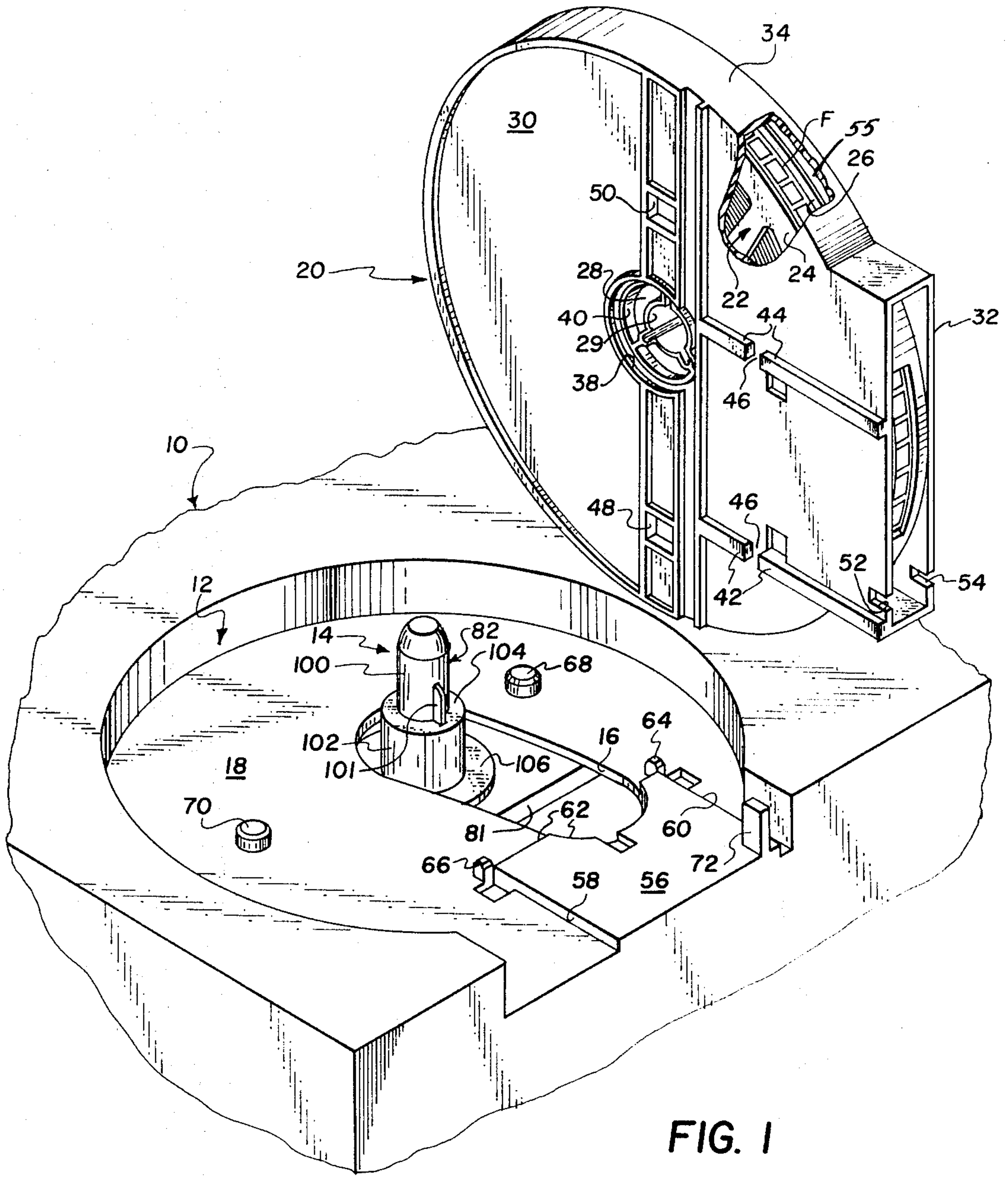
FIG. 1 is a perspective view of a fragmentary portion of a cartridge-loading motion picture projector or the like showing a cartridge for such projector adjacent to the projector.

The cartridge includes structure for locating or orienting the cartridge at a predetermined location with respect to projector plate 10. The orienting structure comprises a pair of spaced and generally parallel ribs 42 and 44 of substantially equal length. Each of these ribs has a discontinuity intermediate its ends to provide a gap as shown at 46. Other locating or orienting structure important for the purpose of this discussion includes a pair of spaced openings 48 and 50 positioned at opposite sides of the opening 38 in cartridge wall 30 and notches 52 and 54 located in the lower edge of cartridge walls 30 and 32, respectively. Film F is removed from the cartridge through an opening 55 (FIG. 1) at the bottom of the cartridge.

The cooperating locating or orienting structure on the projector comprises an island or raised portion 56 at one end of well 12 having spaced and generally parallel side edge surfaces 58 and 60 and an upper edge 62 having straight end portions and a curved center portion. Edge surfaces 58 and 60 are adapted to be engaged by the inner edges of ribs 42 and 44 to locate the cartridge and to prevent its movement in either of two opposite directions in the plane of the well, i.e., in directions extending generally toward the lower left and the upper right as viewed in FIG. 1. Two spaced abutments 64 and 66 located at the upper ends of edge surfaces 58 and 60 are positioned and dimensioned so that they are received within the gaps 46 of ribs 42 and 44, respectively. These abutments establish the position of the cartridge and limit its movement in two opposite directions in the plane of the well, i.e., in directions extending generally toward the upper left and lower right as viewed in FIG. 1. In addition, a pair of spaced pins or circular abutments 68 and 70 in well 12 are adapted to enter openings 48 and 50, respectively, in the cartridge. Cooperation between the latter abutments and openings 48 and 50 help to establish the location of the cartridge within the plane of the well. A projection 72 at the lower edge of the well is adapted to enter cartridge notches 52 and 54 when the cartridge is positioned into the well. Projection 72 is asymmetrically located to prevent insertion of the cartridge into the well with cartridge wall 2 facing the bottom wall 18 of the well. Surface 62 is adapted to cooperate with a mating surface on cartridges of other sizes or configurations, such as the cartridge construction disclosed in the beforementioned copending U.S. Pat. application, Ser. No. 736,524.

Well 12 is located in a substantially horizontal plane, and, accordingly, there is no need to latch or fasten the cartridge to prevent its movement in a vertical direction since the force of gravity acting on the cartridge is sufficient to normally hold it in its mounted position in the well. Because of the absence of latching means, the cartridge is free to move upwardly in response to forces that may be encountered during operation of the projector as will be described more fully hereinafter.

For the reasons mentioned in the preceding description, during rotation of the reel within the cartridge one or both of the reel flanges may tend to rotate in the paths shown in phantom in FIG. 2, thereby creating considerable friction between the reel flanges and the cartridge, particularly when the reel is adapted to carry substantially long lengths of film (e.g. 400 foot lengths of film). The spindle construction of the present invention and the mounting of the cartridge on the projector in accordance with the present invention minimizes this undesirable frictional contact and permits relief in the event abnormal high frictional forces are encountered.

Figure 3:
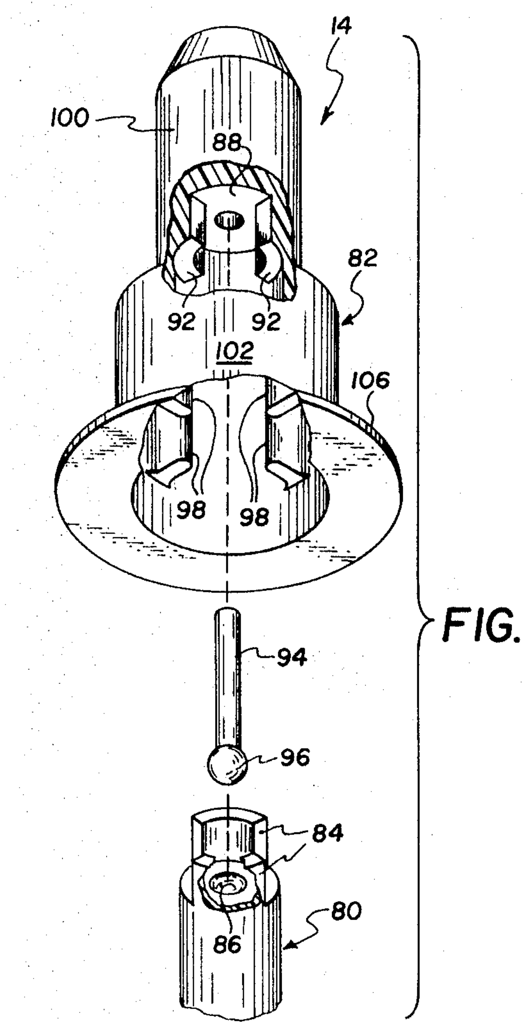
FIG. 3 is an exploded view, partially in section, of the spindle construction shown in FIG. 2.

Referring now to FIGS. 2 and 3, spindle 14 comprises a first spindle part illustrated in the form of a shaft 80 rotatable about an axis A, and a second spindle part shown in the form of a hub 82 which is mounted on shaft 80 for pivotal movement with respect to shaft 80. More specifically, the shaft 80 is carried by a lever 81 and is adjustable by movement of the lever to various positions along slot 16. This adjustment may be effected in the manner disclosed in the copending U.S. Pat. application, Ser. No. 777,286. The upper end of shaft 80 has a pair of spaced, upwardly projecting, generally arcuate teeth 84 which extend approximately one-quarter of the way around of the circumference of the shaft. Positioned between the teeth is a socket comprising a mounting or pivot surface 86. Surface 86 is preferably in the shape of a segment of a sphere having a center of curvature located along the axis of rotation A. Shaft 80 is adapted to be rotated about axis A from a suitable power source, such as a driving mechanism (not shown) forming part of the motion picture projector.

Hub 82 is hollow and has stepped interior and exterior surfaces. The interior of the hub includes an inner substantially cylindrical recess formed by a wall 88 and a somewhat larger outer recess formed by wall 90. A pair of spaced, generally arcuate teeth 92 on wall 88 project into the inner recess. Each of the teeth 92 extends for slightly less than one-quarter of the circumference of wall 88 and they are dimensioned so that they fit between teeth 84 on the upper end of shaft 80, thereby establishing a driving connection between the shaft and the hub so that when the parts are assembled as illustrated in FIG. 2, rotation of shaft 80 simultaneously effects rotation of hub 82. Secured to the hub and projecting downwardly into the inner recess is a pin 94 which carries at its lower end a ball 96 or other member having a generally spherical surface. The radius of curvature of the surface of ball 96 is substantially equal to the radius of curvature of spherical surface 86 on the shaft. The ball 96 and surface 86 are located on their respective spindle parts so that the ball rests on surface 86 and is adapted to pivot with respect to surface 86 about a pivot point located at the center of the spherical surface of the ball and also located on the axis of rotation A of the shaft. The extent of this pivotal movement of the hub with respect to the shaft is limited by a plurality of ribs 98 projecting inwardly from 90. As will be observed from FIG. 2, the inner edges of ribs 98 and the wall 88 are dimensioned with respect to shaft 80 so that there is adequate space around the portion of shaft 80 located within hub 82 to permit wobbling or pivotal movement of the hub illustrated by the phantom lines in FIG. 2.

The outer surface of hub 82 comprises a cylindrical upper surface portion 100 positionable within opening 29 in the reel hub. A key 101 projecting from surface 82 is positionable in any one of several keyways conventionally provided in the hub of the reel to lock the spindle and reel together for rotation. The outer surface of hub 82 also includes a larger lower cylindrical surface portion 102 that projects downwardly from the reel through slot 16 in the projector wall. Surface portion 102 is somewhat smaller in diameter than the width of slot 16 so that engagement between the surface portion 102 and the slot 16 does not interfere with the limited pivotal movement of the spindle hub on the shaft. An annular shoulder 104 between surface portions 100 and 102 is engaged by the lower portion of the reel hub 28 for supporting the reel in the desired horizontal plane. An outwardly projecting annular flange 106 at the lower end of hub 82 and adjacent projector wall 18 preferably has a diameter which exceeds the width of slot 16, thereby preventing complete inadvertent disassembly of the spindle parts by upward movement of the hub with respect to the shaft. This flange is desirable when, as in the present embodiment, only the force of gravity holds hub 82 on shaft 80, and there is no means provided or necessary for fastening the spindle hub onto the shaft.

As will be observed from FIG. 2, the center of curvature of the spherical surface of ball 96 is located substantially at the center of the rotating mass (i.e., the reel and film) supported by the spindle. This location of the pivot is preferred since this allows the reel to pivot most freely and easily about the pivot point.

As will be observed from FIG. 2, the reel hub rests on shoulder 104, and this serves to accurately locate the reel relative to the cartridge and wall 18.

In operation, a cartridge 20 with a reel 22 therein containing film F is positioned over wall 18 with cartridge wall 30 facing wall 18 of the well, with the opening 29 in the reel aligned with the axis of spindle 14, and with the cartridge locating or orienting structure including ribs 42, 44 and notches 52, 54 located over the cooperating structure on projector plate 10. Then the cartridge is moved downwardly until the cartridge is seated in well 12. During such movement, the opening in the reel hub receives spindle 14. As this downward movement occurs the locating and orienting structures on the cartridge and projector locate the cartridge in the desired position on the projector. Then the projector drive can be coupled to the spindle to rotate the reel within the cartridge. As will be apparent to those skilled in the art, during such rotation of the reel the film is extracted from the cartridge through opening 55 for delivery through the projector to a takeup reel.

In the event the reel flanges engage cartridge walls 30 and 32 during rotation of the reel within the cartridge, the spindle construction of this invention permits the reel flanges to pivot about a point located at the center of curvature of ball 96 and thereby move (within predetermined limits) away from the cartridge walls, thus minimizing the undesirable frictional contact between the reel and cartridge. Because the pivot is located at the center of the rotating mass, very little force is required to produce the desirable pivotal movement of the reel. As a result of the pivoting of the hub 82, the axis of rotation of the spindle hub and reel during rotation of the reel may move along a substantially conical path. The maximum extent of pivotal movement of the hub relative to the shaft 80 is determined by ribs 98 on the hub which will contact the shaft after the hub has tilted or wobbled through a predetermined arc.

In some cases it may be possible that the reel flange 26 will engage cartridge wall 32 even after the spindle has been tilted through its maximum angle of inclination, and that the force exerted by the reel flange against the cartridge wall will be great enough to lift the cartridge from the bottom wall 18 of well 12. This is permissible in accordance with the present invention due to the novel locating or orienting structure for the cartridge which eliminates the need for latching of the cartridge to the projector, and due to the presence of studs 68 and 70 which serve to guide the cartridge though limited movement in a vertical direction (i.e., in a direction substantially parallel to the axis of spindle 14). While the resulting frictional forces may be high under these abnormal conditions, the permissible movement of the cartridge does reduce the total frictional force to a level that permits satisfactory operation of the projector.

Figure 5:
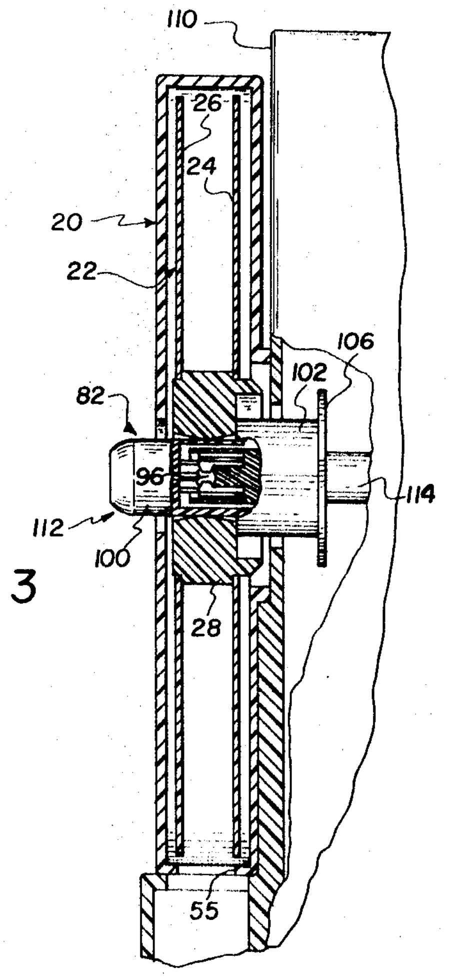
FIG. 5 is a view similar to FIG. 2 showing the spindle of FIG. 4 and its relation to a reel and cartridge.
Figure 4:
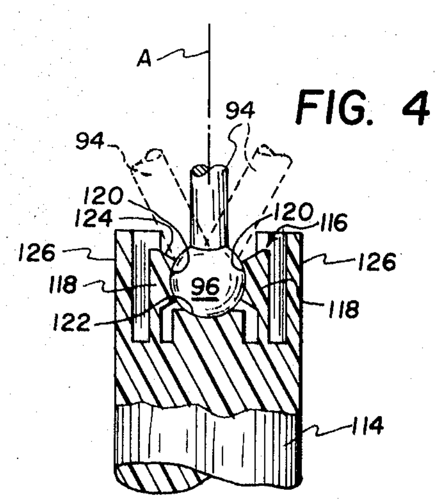
FIG. 4 is an enlarged fragmentary section illustrating a second preferred embodiment of a spindle of this invention.

Another embodiment of the spindle construction of the invention is illustrated in FIGS. 4 and 5. The construction of the cartridge 20 and reel 22 illustrated in FIG. 5 may be the same as that previously described, and the location and latching of the cartridge to the projector may be accomplished in the manner described in the copending U.S. Pat. application Ser. No. 736,524 filed on May 23, 1968. In this instance, the cartridge is latched in place against a wall 110 of a projector, and this wall is illustrated as being in a substantially vertical plane, thereby locating the cartridge and reel in a substantially vertical plane. The axis of rotation of the spindle is substantially horizontal, and it is desirable that some means be provided to prevent separation of the ball and socket which pivotally couple the spindle parts together.

The spindle construction shown in FIGS. 4 and 5 is generally designated 112 and it comprises a hub which may be identical to the previously described hub 82; therefore, the same reference numerals have been used to designate the various parts of the hub. Spindle 112 has a shaft 114 having at its outer end a socket generally designated 116 which comprises a plurality of fingers 118 located in spaced relation to each other and extending generally in a direction parallel to the axis of rotation A of the shaft. Each of the fingers has an inner surface 120 defining a segment of a sphere, and these surfaces are positioned around a surface 122 which also defines a segment of a sphere. Surface 122 is somewhat similar to the previously described socket surface 86. The surfaces 120 and 122 are located with respect to each other so that they bound a substantially spherical space having a radius of curvature substantially equal to the radius of curvature of ball 96. Thus, when the ball is in engagement with surfaces 120 and 122, the fingers pivotally mount the ball and retain it against inadvertent removal from shaft 114. Fingers 118 are preferably flexible so that they may be deflected outwardly away from each other to permit insertion and removal of the ball from the socket. Insertion of the ball is facilitated by the provision of a beveled upper edge 124 on each finger that is inclined downwardly and inwardly toward the center of the socket so that pressure of the ball acting against edges 124 produces a component of force which acts against the fingers to urge them outwardly and away from each other to permit the ball to be seated in the socket. The flexible fingers then snap back toward each other to capture the ball between the fingers and in pivotal engagement with surfaces 120 and 122.

Shaft 114 further comprises a pair of axially extending teeth 126 which are adapted to cooperate with the teeth 92 of the spindle hub for effecting rotation of the hub and the reel when shaft 114 is driven.

During operation, ball 96 is free to pivot within the socket formed by fingers 118 and surface 122 to permit the desirable wobbling action or motion of spindle hub 82 in response to forces generated by rotation of the reel within the cartridge. This movement is illustrated in FIG. 4 by the solid and phantom positions for shaft 94. Thus the spindle depicted in FIGS. (4) and 5 is essentially identical in operation to the previously described spindle. While spindle 112 has been described in connection with the horizontal positioning of the spindle, it will be understood that it also can be positioned vertically (as illustrated for spindle 14) or in various other attitudes.

The invention has been described in detail with particular reference to preferred embodiments thereof, but it will be understood that variations and modifications can be effected within the spirit and scope of the invention.

I claim:

1. In a spindle for supporting a reel for limited movement with respect to a machine, the improvement comprising:
   a first spindle part adapted to be carried by the machine for rotation about a first axis,
   a second spindle part adapted to be carried by the first spindle part for rotation about a second axis,
   means on one of said spindle parts for rotatably supporting a reel during such rotation, and
   cooperating means on each of said spindle parts for pivotally coupling said parts together for universal movement between the parts about the point of intersection of said axes of rotation.

2. The improvement as set forth in claim 1 wherein said cooperating means comprises a spherical member and a socket engageable by said member.

3. In a spindle as set forth in claim 2 wherein said socket comprises a plurality of fingers located in spaced relation to each other, each of said fingers having a surface defining a segment of a sphere, said surface being engageable with said spherical member and being located with respect to each other for retaining said spherical member between said fingers during relative pivotal movement between the parts, and each of said fingers being flexible in a direction to permit insertion of said spherical member between said fingers and removal of said spherical member from between said fingers.

4. In a spindle construction for supporting a reel for rotation within a cartridge positioned on a motion picture projector or the like, the improvement comprising:
   a spindle shaft having at an end portion thereof means defining a socket generally in the shape of a segment of a sphere;
   a spindle hub having a portion thereof adapted to receive the reel for supporting the reel within the cartridge and for rotating the reel with respect to the cartridge, said spindle hub comprising means having a generally spherical surface engageable with said socket for pivotally mounting said hub for substantially universal movement with respect to said shaft whereby said hub and the reel carried thereby are adapted to adjust their positions relative to the spindle shaft in response to operating conditions encountered by the reel during rotation of the reel within the cartridge; and cooperating means carried by said shaft and said hub for coupling said parts together for conjoint rotation.

5. The improvement as set forth in claim 4 wherein said spindle hub has a shoulder engageable by a portion of the reel for supporting the reel within the cartridge.

6. The improvement as set forth in claim 4 wherein said projector has a wall with an elongate slot therein through which said spindle hub projects, and said spindle hub further comprises a flange positioned on the hub and having a dimension with respect to the width of said slot to prevent complete passage of the spindle through the slot.

7. The improvement as set forth in claim 4 wherein said means defining a socket comprises a plurality of fingers located in spaced relation to each other, each of said fingers having a surface defining a segment of a sphere, said surfaces on said fingers being engageable with said spherical surface of said hub and being located with respect to each other for retaining said spherical surface of said hub between said fingers during relative pivotal movement between the hub and the shaft, and each of said fingers being flexible in a direction to permit insertion of said spherical surface of said hub between said fingers and removal of said spherical surface of said hub from between said fingers.